(12) United States Patent
Chiang

(10) Patent No.: US 9,240,299 B2
(45) Date of Patent: Jan. 19, 2016

(54) PIVOTABLE KEY STRUCTURE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hsiao-Lung Chiang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 171 days.

(21) Appl. No.: 14/058,458

(22) Filed: Oct. 21, 2013

(65) Prior Publication Data

US 2014/0332359 A1    Nov. 13, 2014

(30) Foreign Application Priority Data

May 8, 2013    (CN) .......................... 2013 1 0167461

(51) Int. Cl.
H01H 3/00    (2006.01)
H01H 21/02   (2006.01)

(52) U.S. Cl.
CPC ..................... H01H 21/02 (2013.01)

(58) Field of Classification Search
CPC ....................................................... H01H 21/02
USPC ............................................. 200/339; 345/173
See application file for complete search history.

(56) References Cited

U.S. PATENT DOCUMENTS

| | | | | |
|---|---|---|---|---|
| 5,804,780 | A * | 9/1998 | Bartha | 200/5 A |
| 6,344,622 | B1 * | 2/2002 | Takiguchi et al. | 200/314 |
| 2005/0052425 | A1 * | 3/2005 | Zadesky et al. | 345/173 |
| 2005/0122315 | A1 * | 6/2005 | Chalk et al. | 345/173 |
| 2006/0250377 | A1 * | 11/2006 | Zadesky et al. | 345/173 |
| 2012/0299832 | A1 * | 11/2012 | Peterson et al. | 345/168 |
| 2014/0267054 | A1 * | 9/2014 | Moore et al. | 345/168 |

* cited by examiner

*Primary Examiner* — Kyung Lee
(74) *Attorney, Agent, or Firm* — Li & Cai Intellectual Property (USA) Office

(57) ABSTRACT

A pivotable key structure includes a housing body, a pivotable unit, a switch module, and a carrier. The pivotable unit has a touchpad module and a pivotable member. The pivotable member is engaged to the touchpad module thereunder. The pivotable member is disposed on the carrier through two pivot axle as a pivot point to relatively pivot on the carrier. The carrier has a switch module corresponding to two pivot axles. The pivotable member has two operating portions which are protrusions, each respectively correspond to the switch module. The housing body has an opening so that the pivotable member can pivot horizontally and be exposed through the opening. Thereby, through the pivoting movements of the pivotable unit toward the switch module, the operating protrusions can contact the switch module and generate a corresponding control signal.

12 Claims, 8 Drawing Sheets

PIVOTABLE KEY STRUCTURE

BACKGROUND OF THE INVENTION

1. Field of the Invention

The instant disclosure relates to a mouse key structure; in particular, to a pivotable key structure which identifies touch control and senses multi-finger gestures control through left and right pivoting movements thereof.

2. Description of Related Art

With the ever improving development of technology, whether PC (personal computer) or laptop (notebook) or other computer equipment, of which all have become a popular and indispensable part of the daily life or work life. However, most computer mouses have split keys designed towards the front-left or front-right portions of the mouses to facilitate direct contact with the user's finger. Conventional structure of the left and right buttons on a mouse correspond to the user's index finger and middle finger, as such, the user are fixed in the same position and the fingers bend or stretch for a long period of time, thus leading to awkward hand movements, numbness and other symptoms. In addition, Apple Inc. has produced the Magic Mouse, in which the top surface of the mouse is designed to provide multi-touch gestures for scrolling through pages and other special features. However, the one surface touch control design of the mouse lowers the sensitivity of user's fingers with respect to the mechanical state of the keys, and significantly loses the control sensitivity, feeling, and the convenience provided by the traditional mouse. Furthermore, since the mouse is designed to pivot back and forth, when the mouse is pressed down towards the front portion, the rear portion naturally pivots (by leverage) up. As a result, the palm of the hand must be lifted off the surface of the rear portion of the mouse, which can cause inconvenience to user's normal operating habits.

To address the above issues, the inventor strives via associated experience and research to present the instant disclosure, which can effectively improve the limitation described above.

SUMMARY OF THE INVENTION

The object of the instant disclosure is to provide a pivotable key structure which identifies touch control and senses multi-finger gestures control through left and right pivoting movements thereof In order to achieve the aforementioned objects, according to an embodiment of the instant disclosure, a pivotable key structure is provided. The pivotable key structure comprises a housing body having portions defining an opening, a pivotable unit includes an touchpad module and a pivotable member, in which the pivotable member correspondingly engages to and configures beneath the touchpad module, a front end and an opposite rear end of the pivotable member each have a pivot axle arranged thereon, the two pivot axles together define a pivot axis and pivot about the pivot axis, two lateral sides of the pivotable member each have an operating portion arranged thereon, and the pivotable unit is exposed from the opening. The operating portion is an operating protrusion. A switch module is electrically connected to and arranged on an electronic processing unit, and the switch module corresponds to the two operating protrusions. A carrier has the electronic processing unit disposed thereon and is engaged to the housing body. The carrier, a front end and a middle region of the housing body may have a switch module or two mounting grooves in total. The two mounting grooves can be selectively arranged on the carrier, the front end, or the middle region. For example, one of the mounting grooves can be arranged on the carrier and the other mounting groove can be arranged on either the front end or the middle region of the housing body. Two mounting grooves can also be arranged on the carrier, but not limited herein. The two pivot axles are pivotally and respectively fitted to the corresponding mounting grooves.

In summary, the pivotable key structure identifies touch control and senses multi-finger gestures control via the pivoting of the pivotable member and the cooperation of the pivotable member and the touchpad module In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. A pivotable key structure of the instant disclosure includes but is not limited to the use of mouses, trackballs, game controllers, and the alike peripheral input devices for personal computers. Other objectives and advantages related to the instant disclosure will be illustrated in the subsequent descriptions and appended drawings.

First Embodiment

Figure 1:
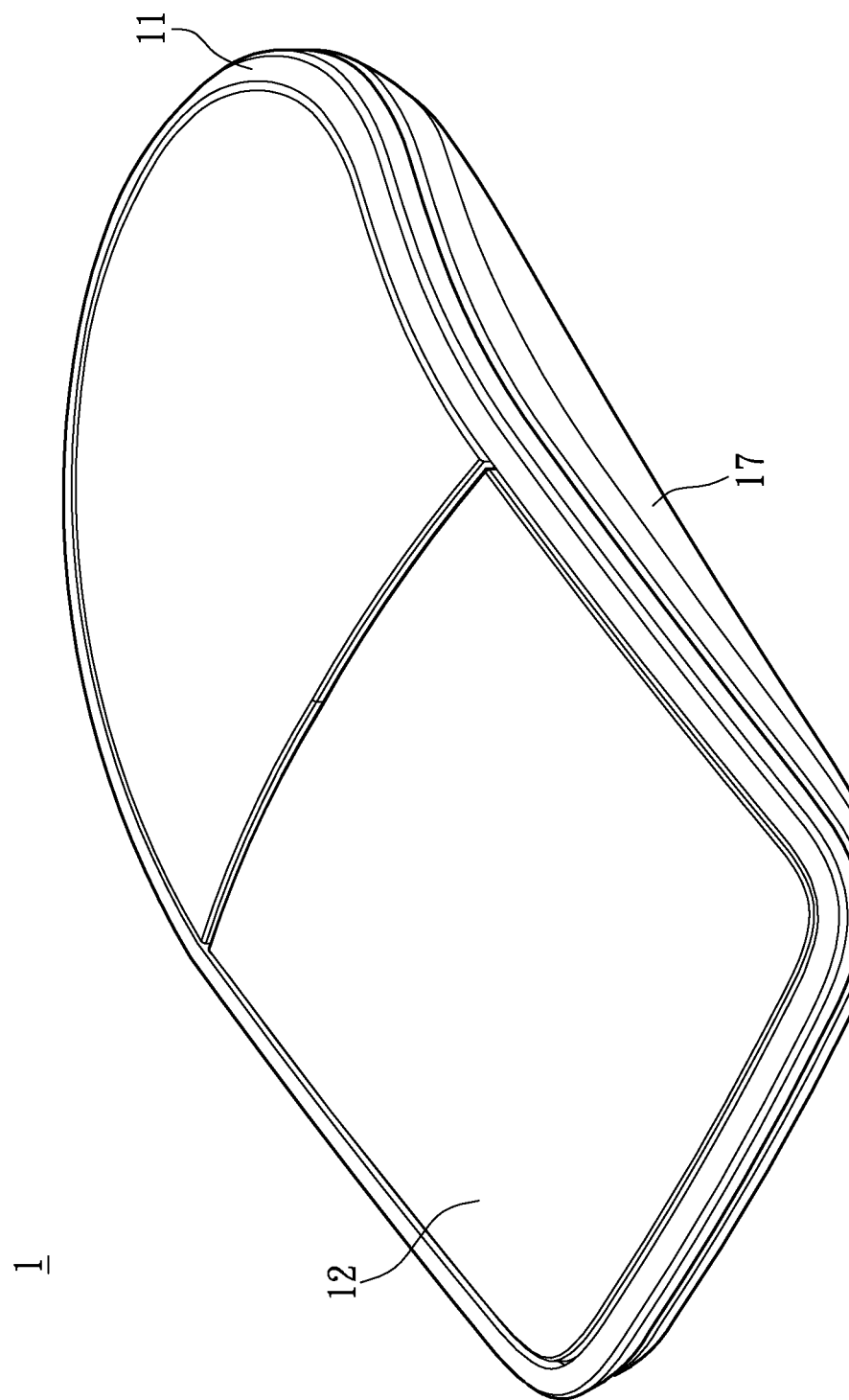
FIG. 1 is an assembled view of a pivotable key structure in accordance with the instant disclosure.

Please refer to FIGS. 1 through 3E. As illustrated in FIGS. 1, 2A, and 3A, the instant disclosure discloses a pivotable key structure 1 comprising a housing body 11, a pivotable unit 12, a switch module 13, and a carrier 14. The housing body 11 and the carrier 14 jointly define a hollow chamber (not shown in figures) therebetween such that the pivotable unit 12, the switch module 12 and an electronic processing unit 141 are accommodated in the hollow chamber. The electronic processing unit 141 is disposed on the carrier 14. The pivotable unit 12 includes a touchpad module 121 and a pivotable member 122 correspondingly configured beneath and engaged to the touchpad module 121. The touchpad module 121 and the pivotable member 122 resemble a curved arc to conform to ergonomics.

Figure 2A:
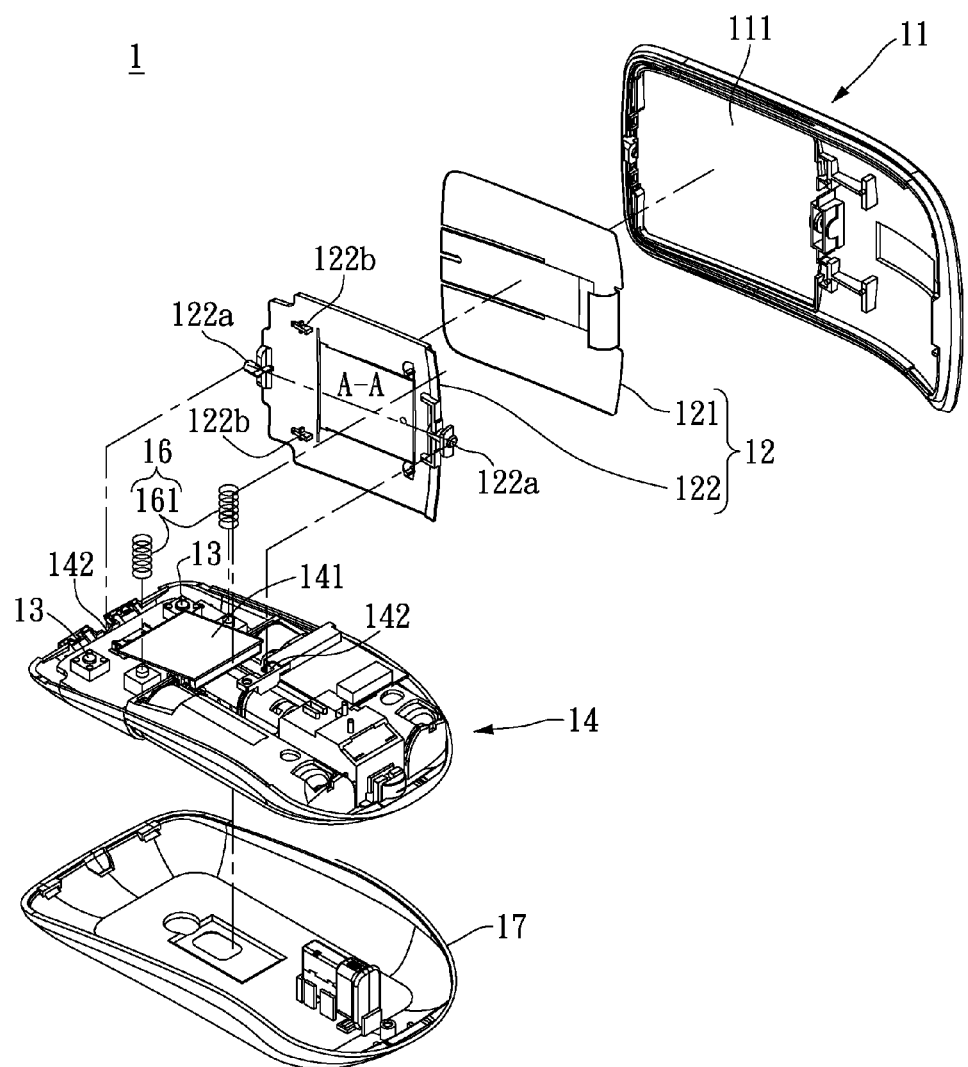
FIG. 2A is an exploded view of the pivotable key structure in accordance with the instant disclosure.
Figure 3A:
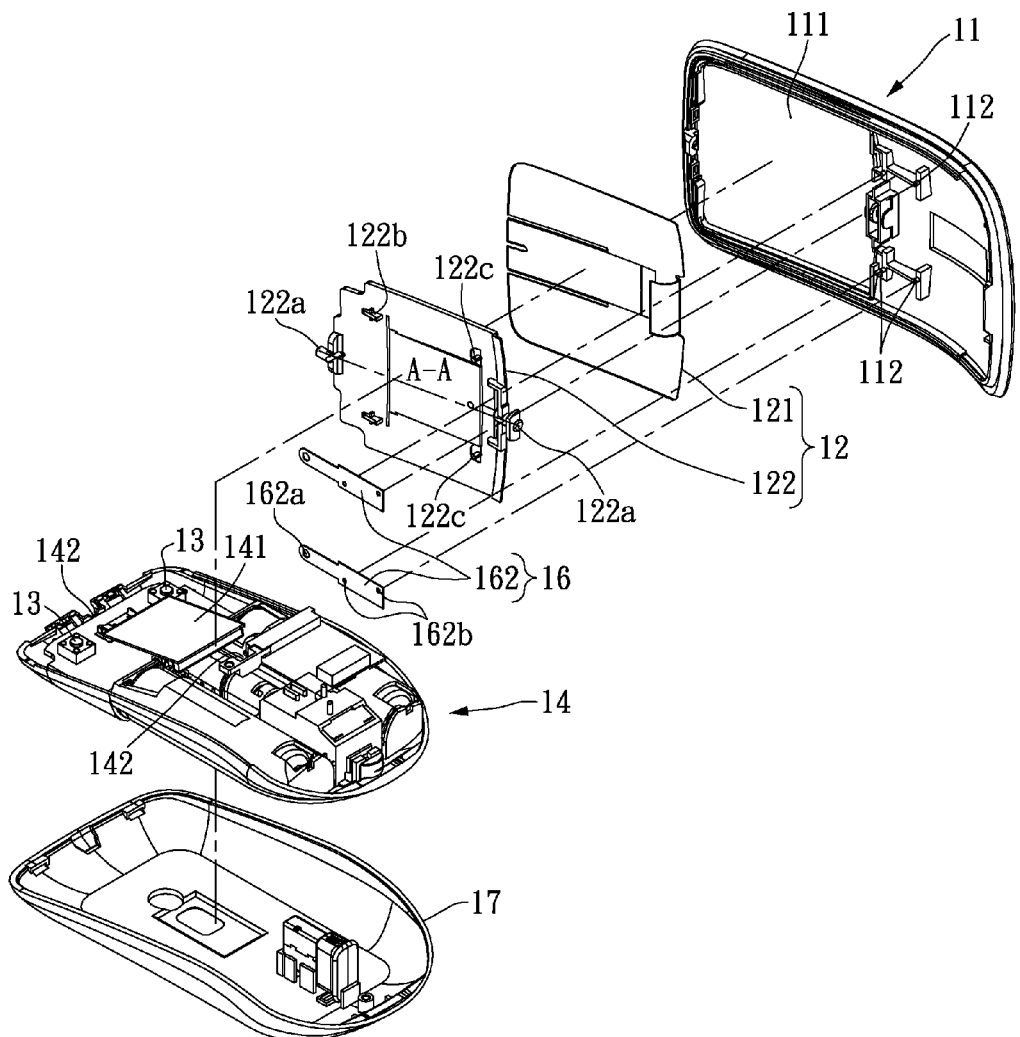
FIG. 3A is a schematic diagram illustrating an elastic member of the pivotable key structure in accordance with the instant disclosure.

As shown in FIGS. 2A and 3A, the pivotable member 122 has a front end and an opposite rear end with each end having a pivot axle 122a arranged thereon. The carrier 14 and the housing body 11 each has a front end and a middle region. Each front end and each middle region of the carrier 14 and the housing body 11 have a mounting groove 142 respectively receiving the two pivot axles 122a for pivoting Thus, the pivotable unit 12 can moderately pivot left and right about a pivot axis A-A defined by the two pivot axles 122a along the longitudinal direction of the pivotable key structure 1. The pivotable member 122 has two operating portions 122b, which are operating protrusions 122b in the instant embodiment, arranged on a surface of two lateral sides of the pivotable member 122 with a pre-determined length between the two protrusions 122b. The switch module 13 is correspondingly configured to the two operating protrusions with a pre-determined distance therebetween. The switch module 13 are two micro switches 13 and are electrically connected and disposed on the electronic processing unit 141 such that when the pivotable unit 12 pivots towards one of the micro switches 13, the corresponding operating protrusion 122b is in contact with the one of the micro switches 13, then a corresponding control signal is generated. The preferred pre-determined distance and the pre-determined length provide contact between the switch module 13 and the operating protrusions 122b when the pivotable member 12 pivots towards one of the switch module 13.

Notably, the housing body 11 has portions defining an opening 111, which corresponds to the pivotable unit 12, such that the pivotable unit 12 can pivot and goes through the opening 111. In other words, the left and right pivoting of the pivotable member 122 and the touchpad module 121 of the pivotable key structure 1 in accordance with instant disclosure provides touch control identifications and multi-finger gesture control functionalities. Moreover, since the pivotable unit 12 and the housing body 11 have separate designs, the pivotable unit 12 has a certain degree of pivot with respect to the carrier 14. Thus, when using the pivotable key structure 1, users can simply operate with only fingers to perform the point and click control inputs, and not necessary using the entire wrist to operate.

In summary, the pivotable structure of pivotable unit 12 facilitates the left and right, point and click control. With such left and right pivoting movements, the left and right key control on a typical mouse can be replaced. Moreover, the pivotable unit 12 can pivot about the support point, the pivot axis A-A, to provide sufficient pivoting of the pivotable unit 12 to press against the switch module 13 disposed on the electronic processing unit 141.

Figure 2B:
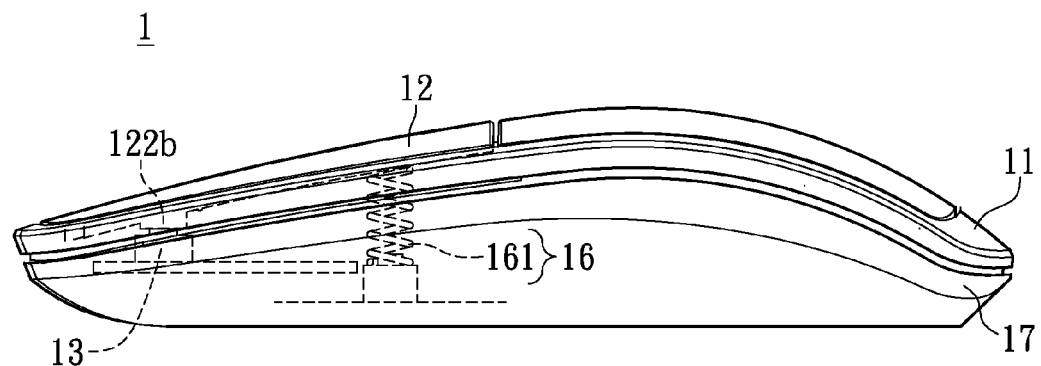
FIG. 2B is a side see-through view of the pivotable key structure in accordance with the instant disclosure.
Figure 2C:
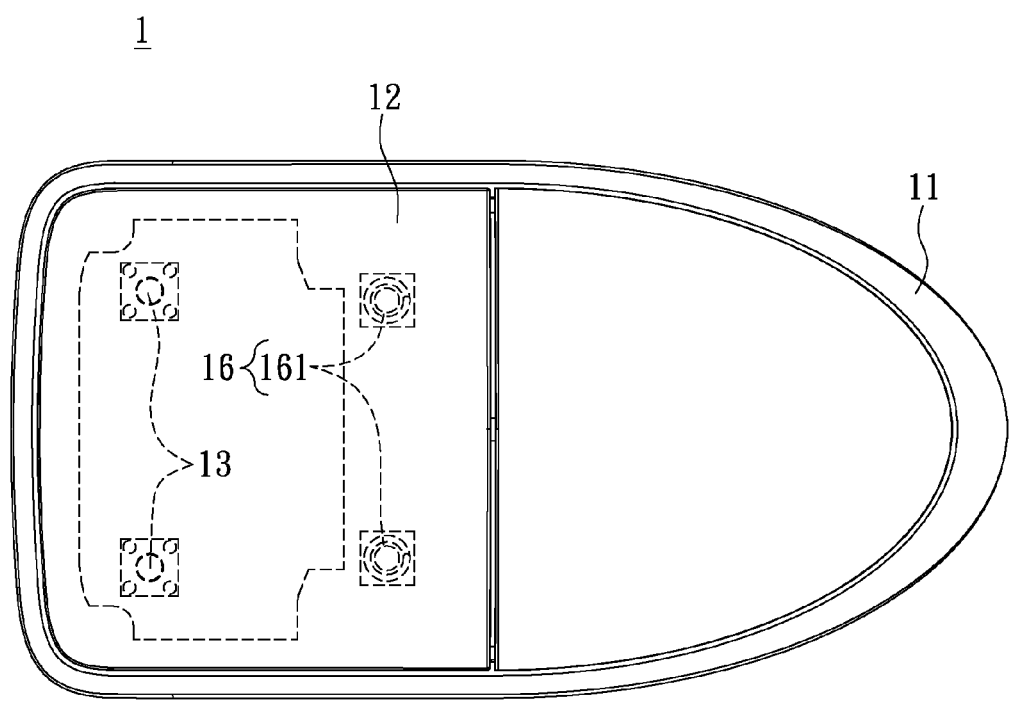
FIG. 2C is a top see-through view of the pivotable key structure in accordance with the instant disclosure.

The following is the first embodiment of the instant disclosure. Please refer to FIGS. 2A to 2C. FIG. 2A is an exploded view of the pivotable key structure in accordance with the instant disclosure. FIG. 2B is a side see-through view of the pivotable key structure in accordance with the instant disclosure. FIG. 2C is a top see-through view of the pivotable key structure in accordance with the instant disclosure. As shown in FIG. 2A, the instant disclosure provides a pivotable unit 12, a switch module 13, and a carrier 14. The electronic processing unit 141 is enclosed between the housing body 11 and the carrier 14. The electronic processing unit 141 can include a circuit board (not shown in figures), and a movement sensor (not shown in figures). The circuit board and the movement sensor are electrically connected. The circuit board can be arranged with relevant electronic parts thereon, such as integrated circuits, optical coordinate input devices, connection cables for computers (not shown figures), and etc. The optical coordinate input devices can be a roller ball, and the connection cables can be infrared. In the instant embodiment, the movement sensor is an optical movement sensor. Since the aforementioned circuit board and movement sensors are well known in the field of electrical engineer, further disclosure of such components are not further elaborated here.

The housing body 11 has a rear half portion and a front half portion which defines an opening 111 corresponding to the pivotable unit 12. The housing body 11 has a front end and a middle region. As shown in FIG. 2A, the front end of the carrier 14 has one mounting groove 142 arranged thereon corresponding to the pivot axle 122a at the front end of the pivotable member 122, and the middle region of the carrier 14 has one mounting groove 142 arranged thereon proximate to the middle region of the housing body 11 and corresponding to the pivot axle 122a at the rear end of the pivotable member 122. Thus, the pivotable unit 12 can be pivotally disposed on the carrier 14 and exposed through the opening 111 such that the pivotable unit 12 can pivot left and right about the pivot axis A-A.

The pivotable unit 12 is exposed through the front half portion of the housing body 11 via the opening 111. The curved exterior appearance of the pivotable unit 12 is extended from the front half portion of the housing body 11 to the rear half portion of the housing body 11. Thus, the exterior appearance of the housing body 11 is uniform and conforms to the grasp of users. In the instant embodiment, the touchpad module 121 of the pivotable unit 12 can be capacitive touch-sensing conductive layers, and the conductive layer has a plurality of touch sensors. The conductive layer can be a flexible and thin film structure having a curved arc shaped. Notably, the touchpad module 121 can be printed thereon or surface-treated. For example, the surface of the touchpad module 121 may have a virtual keypad disposed thereon, which conforms to ergonomic designs, or may be directly printed thereon with text or graphics of specific trademarks or brands.

The pivotable key structure 1 can further include a base 17 as shown in FIGS. 2A and 3A. Since the base 17 is engaged to the housing body 11 and jointly encasing the carrier 14 therein, the electronic processing unit 141 accommodated between the housing body 11 and the carrier 14 is isolated from direct contact with the surrounding atmosphere. Thus, preventing the electronic processing unit 141 from damages due to external matter, preventing poor test results of electro-magnetic interference, and increasing the product yield and usable life of the instant disclosure.

The two switch modules or micro switches 13 are electrically connected to and mounted on the electronic processing unit 141. The pivot axles 122a of the pivotable member 122 are the supporting points for the pivotable member 122 such that when in operations, the operating protrusions 122b at two lateral sides of pivotable member 122 contact the corresponding micro switch 13 as the pivotable member 122 pivots left or right. As shown in FIGS. 2A and 3A, the pivotable member 122 has two operating protrusions 122b arranged thereon proximate to two lateral sides of the front end of the housing body 11. The two operating protrusions 122b and the two switch modules 13 are correspondingly spaced apart with the pre-determined distance. The operating protrusions 122b of the pivotable member 122 each has an elastic member 16 arranged thereon proximate to two lateral sides of the middle region of the housing body 11. The elastic members 16 have sufficient elasticity to provide elastic support for left and right pivoting of the pivotable member 122.

Please refer to FIGS. 2B and 2C as an operating state of the elastic member 16. The elastic member 16 supports the pivotable unit 12 from under the pivotable unit 12 and serves as an elastic support for the pivotable unit 12. Sensitivity and control over the two switch modules 13 can be adjusted via the elastic members 16. Thus, improving the control of the mouse, or any pointing input devices. Notably, the elastic member 16 and the pivotable unit 12 are configured normal to each other such that two opposing top and bottom portions of the elastic member 16 are respectively engaged to the pivotable unit 12 and the carrier 14. Preferably, the elastic member 16 is a spring 161.

Figure 2D:
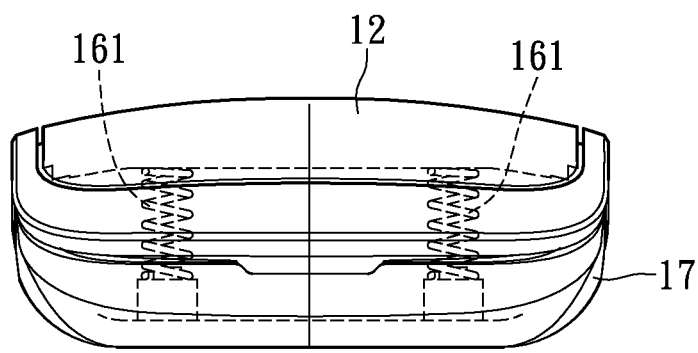
FIG. 2D is a schematic diagram illustrating the operational state of the pivotable key structure in accordance with the instant disclosure.
Figure 2E:
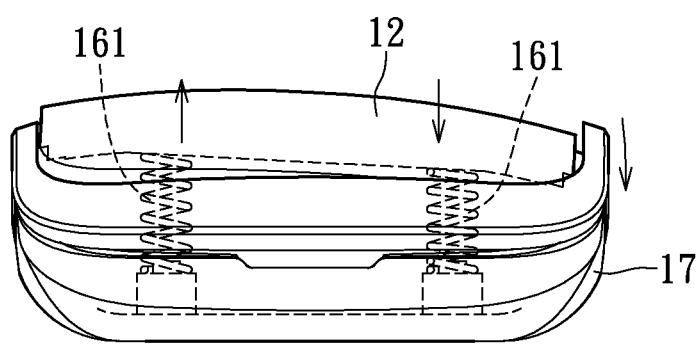
FIG. 2E is another schematic diagram illustrating the operational state of the pivotable key structure in accordance with the instant disclosure.

Please refer to FIGS. 2D and 2E. FIG. 2D is a schematic diagram illustrating the operational state of the pivotable key structure in accordance with the instant disclosure. FIG. 2E is another schematic diagram illustrating the operational state of the pivotable key structure in accordance with the instant disclosure. As shown in FIG. 2D, when the pivotable key structure 1 is in use, the pivot axis A-A (FIG. 2A), which is defined at the center parting line along the longitudinal direction of the pivotable key structure 1, and the two springs 161, which provide support and balance, can maintain the pivotable unit 12 at an equilibrium state. As shown in FIG. 2E, when one of the switch modules 13 is desired for activation, for example, the left micro switch, users may press down on any portion of the front-left half surface of the pivotable unit 12 to simply pivot the half surface of the pivotable unit 12 downwards along the pivot axis A-A and activate the switch modules 13. The aforementioned control of the pivotable member 12 is relatively more simple and convenient to control compared with the conventional key structures which requires a fixed positioning of the fingers.

Figure 3B:
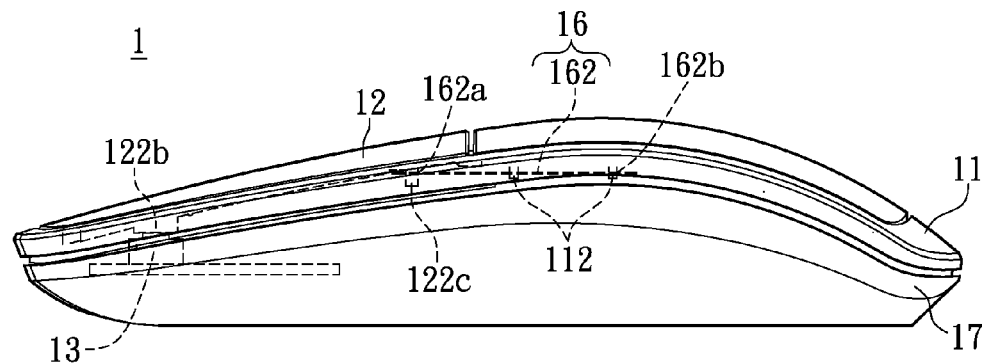
FIG. 3B is a side see-through view illustrating the elastic member of the pivotable key structure in accordance with the instant disclosure.
Figure 3C:
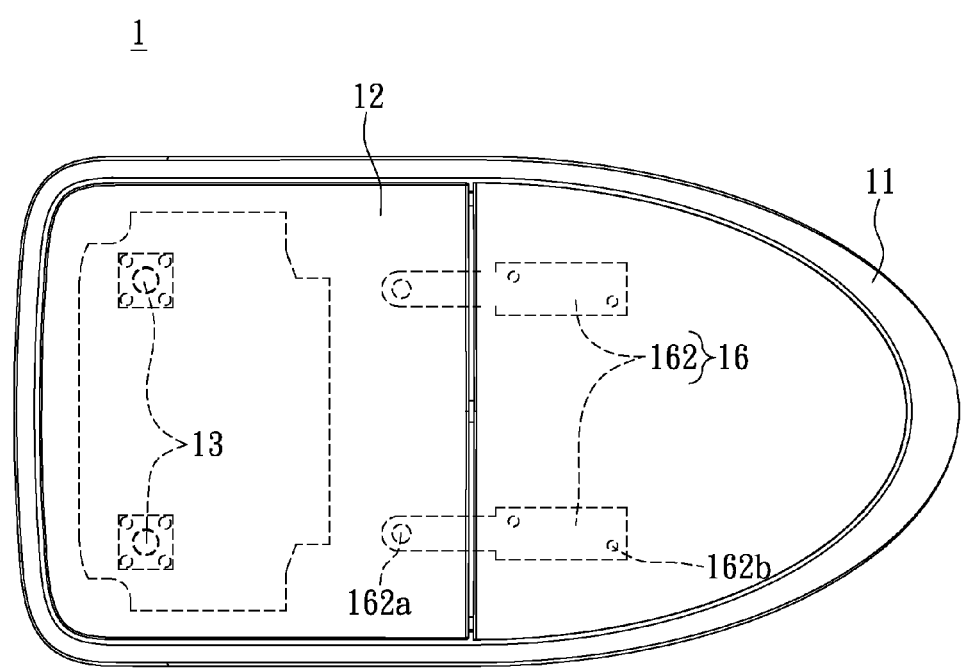
FIG. 3C is a top see-through view illustrating the elastic member of the pivotable key structure in accordance with the instant disclosure.

Please refer to FIGS. 3A to 3C as another operating state of the elastic member 16. FIG. 3A is a schematic diagram illustrating an elastic member of the pivotable key structure in accordance with the instant disclosure. FIG. 3B is a side see-through view illustrating the elastic member of the pivotable key structure in accordance with the instant disclosure. FIG. 3C is a top see-through view illustrating the elastic member of the pivotable key structure in accordance with the instant disclosure. As shown in FIG. 3A, the pivotable member 122 has two elastic members 16 arranged thereon and correspondingly arranged proximate to two lateral sides of the middle region of the housing body 11. The elastic member 16 and the pivotable member 122 are configured in parallel to each other, and the elastic member 16 can be attached between the pivotable member 122 and the housing body 11 via fusing, adhesion, or locking. The elastic member 16 can be the elastic piece 162. Preferably, the elastic piece 162 is an elastic metal plate. FIGS. 3A to 3C show the configuration between the elastic piece 162, the pivotable member 122 and the housing body 11. The pivotable member 122 may have a pivotable protrusion 122c arranged thereon proximate to the middle region of the housing body 11. The housing body 11 may have a protrusion 112 arranged proximate to the middle region thereof. One end of each elastic piece 162 has portions defining a first through hole 162a for at least one pivotable protrusion 122c to fit through, and the other end of each elastic piece 162 has portions defining a second through hole 162b for at least one pivotable protrusion 122c to fit through. Thus, the elastic pieces 162 are fixed and mated between the pivotable member 122 and the housing body 11 to respectively provide elastic support for the left and right pivoting. Notably, since the elastic pieces 162 occupy less volume compared to the springs 161 (as shown throughout FIGS. 2A to 2E), coupling the pivotable member 122 and the elastic piece 162 to the housing body 11 can significantly improve design accuracy.

Figure 3D:
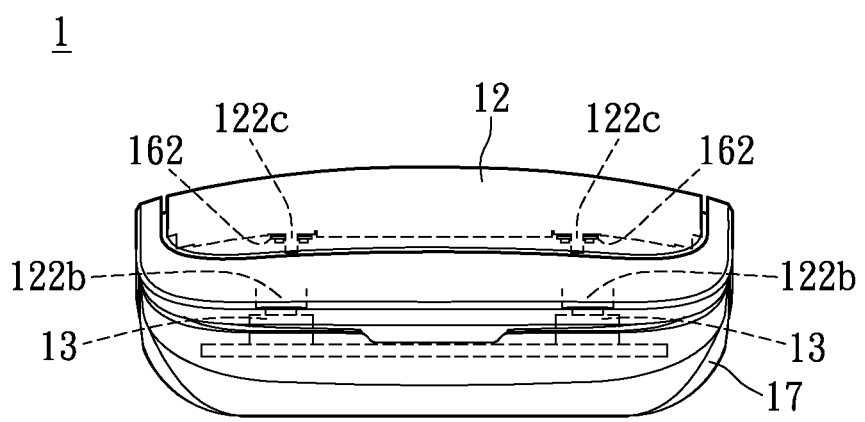
FIG. 3D is a schematic diagram illustrating the operational state of the elastic member of the pivotable key structure in accordance with the instant disclosure.
Figure 3E:
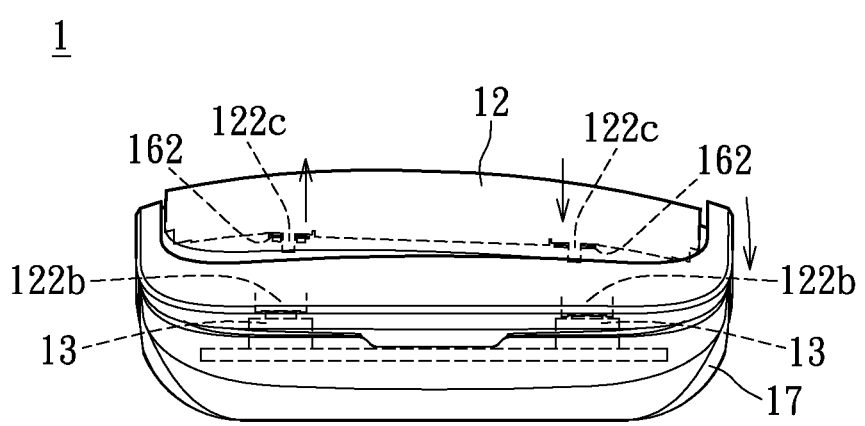
FIG. 3E is another schematic diagram illustrating the operational state of the elastic member of the pivotable key structure in accordance with the instant disclosure.

Please refer to FIGS. 3D and 3E. FIG. 3D is a schematic diagram illustrating the operational state of the elastic member of the pivotable key structure in accordance with the instant disclosure. FIG. 3E is another schematic diagram illustrating the operational state of the elastic member of the pivotable key structure in accordance with the instant disclosure. As shown in FIG. 3D, when the pivotable key structure 1 is in use, the pivot axis A-A (FIG. 2A), which is defined at the center parting line along the longitudinal direction of the pivotable key structure 1, and the two elastic pieces 162, which provide support and balance, can maintain the pivotable unit 12 at an equilibrium state. As shown in FIG. 3E, when the user press down on any portion of the front-left (or front-right) half surface of the pivotable unit 12, portions of the elastic pieces 162 are displaced. For example, when the front-left half surface of the pivotable unit 12 is pressed down on, a front-left portion of the elastic piece 162 also elastically displaces whereas a rear-left portion of the elastic piece 162 is still secured at the housing body 11 without displacement. At which time, a front-right portion of the elastic piece 162 displaces upwards, and a rear-right portion of the elastic piece is still secured at the housing body 11 without displacement. A right surface of the pivotable unit 12 then slightly bents upwards such that the protrusion 112b arranged at a front-left portion of the pivotable member 122 contacts the micro switch 13 arranged at the left side, and thus, a corresponding control signal is generated. When the pivoting unit 12 is no longer pressed, front portions of the two elastic pieces 162 will apply a force, which is released due to the restoration energy stored in the elastic pieces 162 when bended, to the corresponding portions of the pivoting unit 12 in order to restore the pivotable member 12 to the original position prior to being pressed.

Second Embodiment

Figure 4:
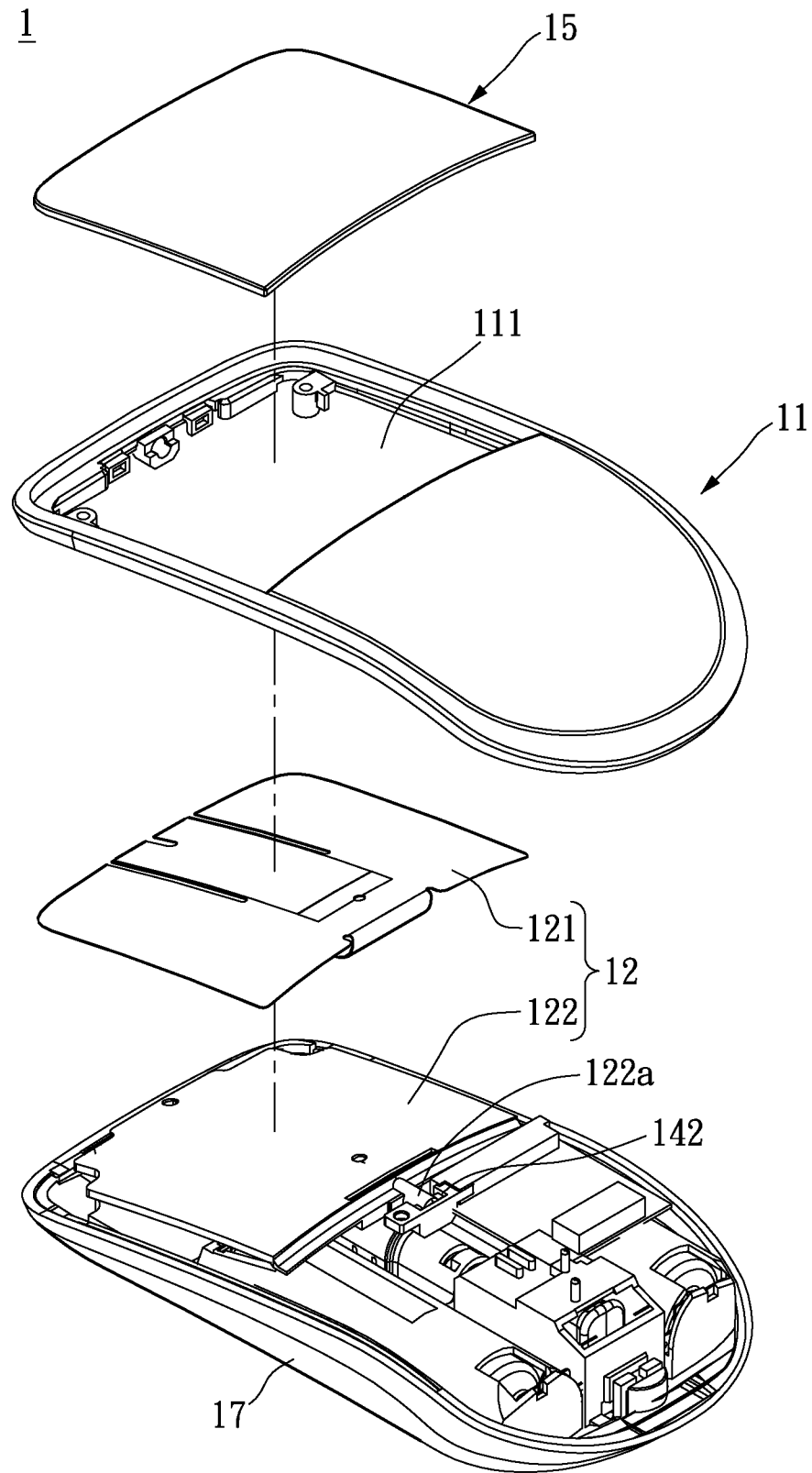
FIG. 4 is an exploded view of the pivotable key structure in accordance with another embodiment of the instant disclosure.

Please refer to FIG. 4 as an exploded view of the pivotable key structure in accordance with another embodiment of the instant disclosure. The instant disclosure provides a pivotable key structure 1, in which the housing body 11, the pivotable unit 12, two switch modules 13, the carrier 14, and the base 17 are similar to the first embodiment. The difference between the instant embodiment and the first embodiment in that a top surface of the touchpad module 121 may further have a covering plate 15 arranged thereon. The touchpad module 121 is engaged beneath the covering plate 15. The covering plate 15 may also be printed thereon or be surface-treated to protect the pivotable unit 12. The surface of the covering plate 15 can also has a plurality of touch-recognition points (not shown in figures) arranged thereon to provide touch-control functionality. Moreover, the covering plate 15 can be made of transparent materials.

Furthermore, the directions disclosed in the instant disclosure such as up, down, left, right, front, rear, etc., only serve as examples to disclose the embodiments provided herein and are not meant to limit the scope of the instant disclosure.

In summary, the instant disclosure provides the following improvements. The pivotable key structure identifies touch control and senses multi-finger gestures control via the pivoting of the pivotable member and the cooperation of the pivotable member and the touchpad module. With the coherent appearance of the housing body and the left and right pivoting movement of the pivotable unit, the pivotable key structure provides point and click control of a pointing input device, which improves upon the conventional "left and right buttons" pointing input devices such as a mouse. Moreover, since the pivotable unit and the housing body are designed separately, the pivotable unit of the pivotable key structure alone provides both the clicking and touch-sensing controls. Since the base is engaged to the housing body and jointly encasing the carrier therein, the electronic processing unit accommodated between the housing body 11 and the carrier is isolated from direct contact with the surrounding atmosphere. Thus, increasing the product yield and usable life of the instant disclosure. Furthermore, since the two elastic members provides support to the pivotable member from beneath, the elastic member can provide sensitive adjustments and control over the two switch modules. In addition, with the two elastic members mated between the pivotable member and the housing body, design accuracy is also significantly improved.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A pivotable key structure, comprising:
   a housing body having an opening, and an inner surface of the housing body having a mountable portion arranged thereon;
   a carrier connected to the housing body, and an inner surface of the carrier having a mountable portion arranged thereon;
   a pivotable unit including a touchpad module corresponding to the opening and a pivotable member corresponding to the touchpad module, two opposite ends of the pivotable member pivotally disposed on the mountable portions of the housing body and the carrier to define a pivot axis, and a surface of the pivotable member having two operating portions arranged thereon;
   wherein the mountable portion of the carrier has two mounting grooves respectively arranged on a front end and a middle region of the inner surface of the carrier and the mountable portion of the housing body has two mounting grooves respectively arranged on a front end and a middle region of the inner surface of the housing body, and the pivotable unit is pivotally disposed on the carrier to pivot thereon; and
   a switch module electrically connected to the electronic processing unit and arranged on the carrier, and the switch module corresponding to the operating portions;
   wherein the pivotable unit pivots towards the switch module such that one of the operating portions correspondingly presses against the switch module to generate a corresponding control signal.

2. The pivotable key structure as recited in claim 1, wherein the touchpad module and the pivotable member resemble curved arcs.

3. The pivotable key structure as recited in claim 1, wherein the pivot axis is aligned with a center parting line of the pivotable key structure along the longitudinal direction.

4. The pivotable key structure as recited in claim 3, wherein the housing body defines the opening at a front half portion thereof corresponding to the pivotable unit, and the pivotable member pivots in the opening.

5. The pivotable key structure as recited in claim 4, wherein a top surface of the touchpad module has a covering plate disposed thereon and the covering plate is surface treatable or printable thereon.

6. The pivotable key structure as recited in claim 1, wherein the two opposite ends of the pivotable member each having a pivot axle arranged thereon, the two pivot axles cooperatively define the pivot axis, the two operating portions are protrusions respectively arranged on two lateral sides of the surface proximate to the front end of pivotable member, the pivot axles are pivotally engaged to the mounting grooves, the pivotable member has two elastic members respectively disposed on the two lateral sides of the pivotable member proximate to the front end of the pivotable member, and the elastic member is configured under and supports the pivotable member to pivot thereon.

7. The pivotable key structure as recited in claim 6, wherein the elastic member and the pivotable unit are configured normal to each other, the elastic member is engaged between the pivotable unit and the carrier, and the elastic member is a spring.

8. The pivotable key structure as recited in claim 6, wherein the elastic member and the pivotable unit are configured in parallel to each other, the elastic member is engaged between the pivotable unit and the housing body, and the elastic member is an elastic piece.

9. The pivotable key structure as recited in claim 8, wherein the pivotable member has at least one pivotable protrusion arranged thereon, the housing body has at least one positioning post arranged thereon, one end of each elastic piece has portions defining a first through hole correspondingly sleeved onto at least one pivotable protrusion, and the other end of each elastic piece has portions defining a second through hole correspondingly sleeved onto at least one positioning post of the housing body.

10. The pivotable key structure as recited in claim 8, wherein the elastic piece is engaged between the pivotable member and the housing body through fusing, adhesion, or locking.

11. The pivotable key structure as recited in claim 1, wherein the electronic processing unit includes a circuit board.

12. The pivotable key structure as recited in claim 1 further comprising:
   a base engaged to the housing body and jointly encasing the carrier.

* * * * *